Nov. 21, 1944.   C. C. COONS   2,363,399
REFRIGERATION
Filed Oct. 2, 1939   4 Sheets-Sheet 2

Fig. 3

INVENTOR
Curtis C. Coons
BY
Harry S. Dwarse
ATTORNEY

Nov. 21, 1944.   C. C. COONS   2,363,399
REFRIGERATION
Filed Oct. 2, 1939   4 Sheets-Sheet 3

INVENTOR
Curtis C. Coons
BY
Harry S. Dumarie
ATTORNEY

Patented Nov. 21, 1944

2,363,399

UNITED STATES PATENT OFFICE 2,363,399

REFRIGERATION

Curtis C. Coons, North Canton, Ohio, assignor to The Hoover Company, North Canton, Ohio Application October 2, 1939, Serial No. 297,508

19 Claims. (Cl. 62—119.5)

This invention relates to the art of absorption refrigerating apparatus and more particularly to a novel absorption refrigeration system embodying various features and constructions which greatly improve the efficiency thereof with respect to previous systems of the general class to which this invention belongs.

It is the principal object of this invention to provide an absorption refrigerating apparatus of the three-fluid type in which an evaporative pre-cooler is provided to lower the temperature of the liquid refrigerant discharged by the condenser substantially to the temperature prevailing in the liquid inlet portion of the evaporator prior to the entry of such liquid into the evaporator, thereby to relieve the evaporator of this pre-cooling load.

It is another principal object of the present invention to utilize the extremely rich inert gas formed by the pre-cooling of the liquid refrigerant to superconcentrate the rich solution returning from the absorber to the boiler and thereby to increase the spread between the refrigerant concentrations of the strong and weak solutions with resulting improvements in the efficiency of the boiler and diminishment of rectification and analyzation losses.

More specifically, it is another object of the present invention to provide an absorption refrigerating system of the type in which the inert gas is utilized to propel the liquid refrigerant through the evaporator with an evaporative pre-cooler which operates by bleeding a small quantity of lean gas from the gas inlet portion of the evaporator into a separate vessel containing liquid refrigerant for the purpose of pre-cooling this liquid and then to utilize the highly concentrated inert gas discharged by the pre-cooler for supercharging the absorption solution enroute from the absorber to the generator.

It is still a further object of the present invention to provide a three-fluid absorption refrigerating apparatus with an evaporative pre-cooler in which the inert gas which traverses the pre-cooler is utilized to superconcentrate a portion of the rich solution which has passed through the absorber, and then to convey the superconcentrated solution to a separate analyzation zone thereby greatly to improve the overall efficiency of the apparatus.

It is still another object of the present invention to provide a three-fluid absorption refrigerating apparatus with an evaporative pre-cooler which is connected in such fashion that the pressure vessel connections are utilized for the circulation of the highly concentrated inert gas which has traversed the evaporative pre-cooler.

It is still a further object of the present invention to provide an absorption refrigerating apparatus of the type immediately above referred to with an absorber extension which operates at a high temperature and which is supplied with the highly concentrated inert gas discharged from the evaporative pre-cooler thereby to greatly increase the refrigerant concentration of the strong solution discharged by the absorbing apparatus.

It is a still further object of the present invention to provide an absorption refrigerating apparatus of the three-fluid type with an evaporative precooler which is embedded in the insulation of the refrigerator cabinet or in the insulated panel element normally provided to enclose the evaporator inserting opening in the rear wall of the cabinet.

Other objects and advantages of the invention will become apparent as the description proceeds when taken in connection with the accompanying drawings, in which.

Figures 1, 2:
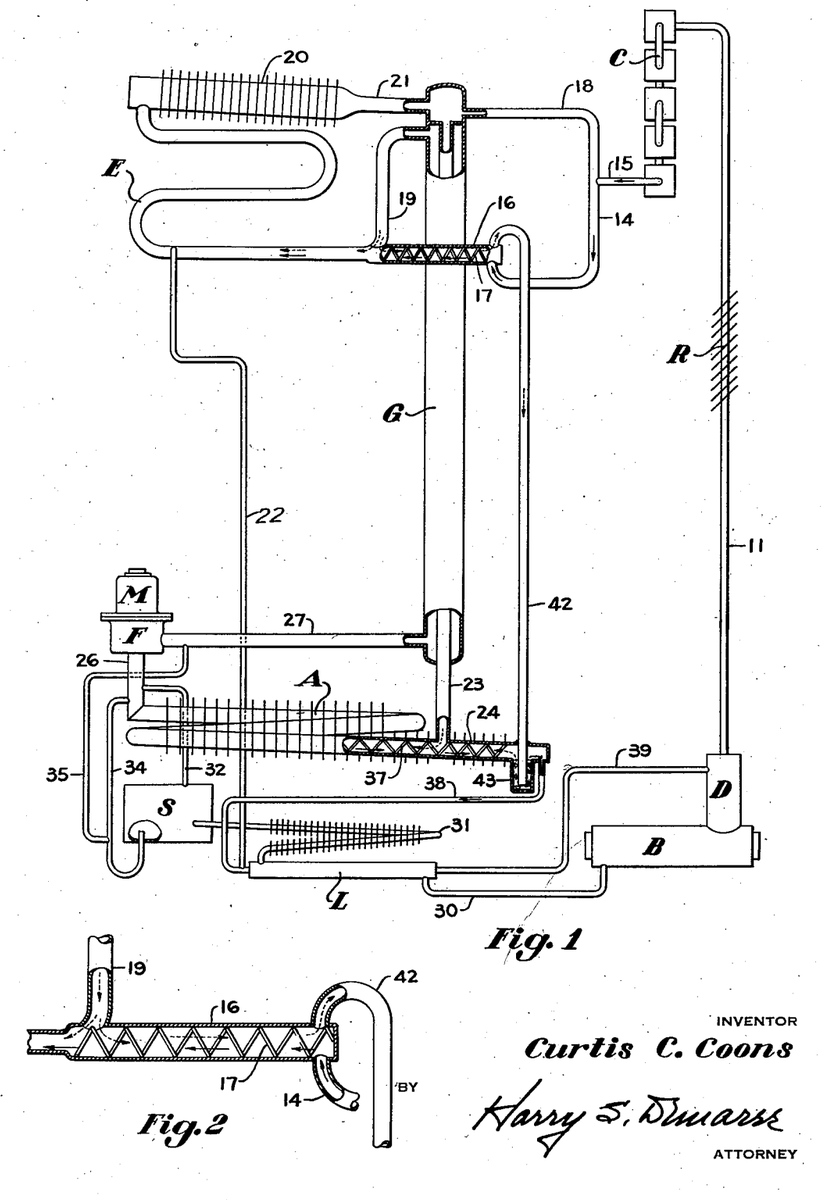
Figure 1 is a diagrammatic representation of an absorption refrigerating apparatus embodying the present invention, certain parts being shown in section.
Figure 2 is an enlarged sectional detail view of certain portions of the apparatus shown in Figure 1.
Figure 3:
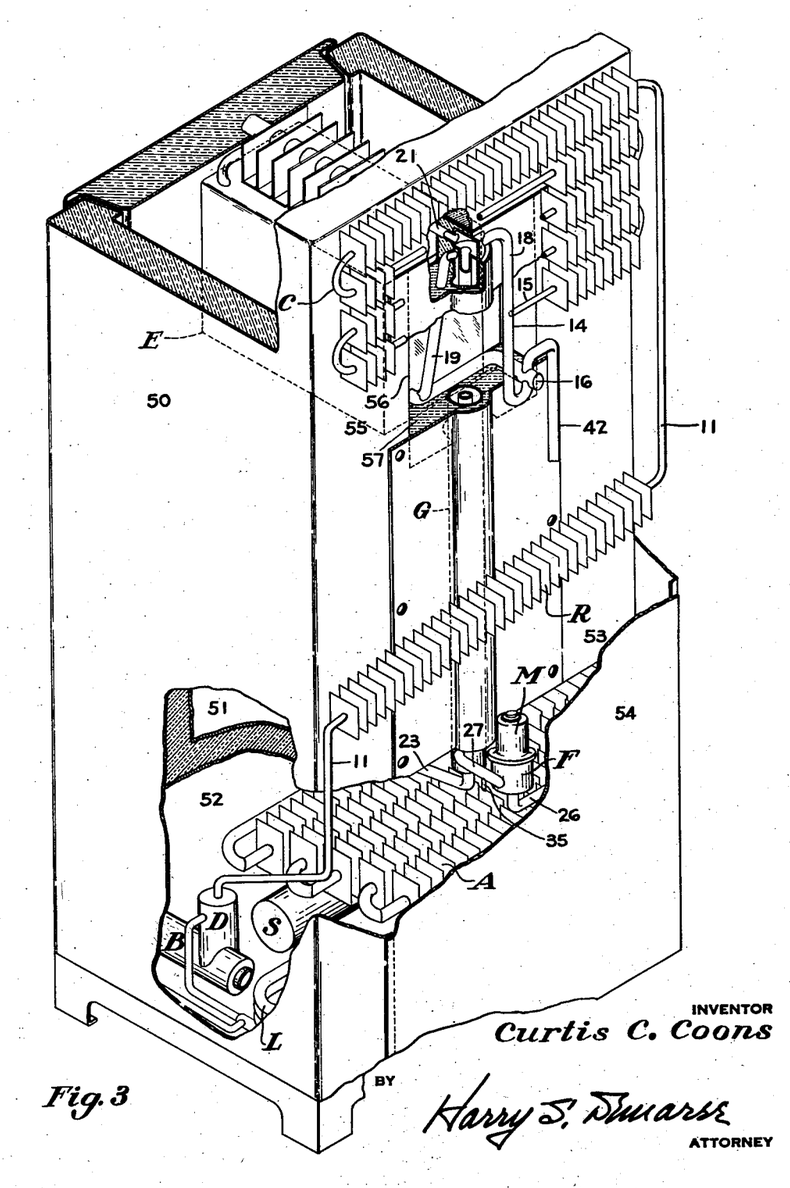
Figure 3 is a perspective view of the rear portion of the cabinet illustrating the arrangement of the apparatus in conjunction therewith, certain portions being broken away to facilitate the illustration.

Referring now to the drawings in detail and first to Figures 1 to 3 thereof, a three-fluid absorption refrigerating system is illustrated diagrammatically in Figure 1 comprising a boiler B, an analyzer D, an air-cooled rectifier R, a tubular air-cooled condenser C, an evaporator E, a gas heat exchanger G, a tubular air-cooled inclined absorber A, a solution heat exchanger L, a solution reservoir S, and a circulating fan F which is driven by an electrical motor M.

The above described elements are suitably connected by various conduits to form a plurality of gas and liquid circuits constituting a complete refrigerating system to which reference will be made in more detail hereinafter.

The above described system will be charged with a suitable refrigerant, such as ammonia, a suitable absorbent therefor, such as water and a pressure equalizing medium, preferably a dense inert gas like nitrogen.

The operation of the system may be controlled in any desired manner. However, it is preferred to heat the boiler B by means of a gaseous fuel burner and to cycle the boiler heater and the circulating motor M in response to refrigeration demand. A preferred control mechanism is disclosed and claimed in my co-pending application, Serial No. 148,424, filed June 16, 1937, now Patent No. 2,228,343, dated January 14, 1941.

The application of heat to strong solution normally contained in the boiler B generates refrigerant vapor therefrom which then passes upwardly into the analyzer D. The vapor thus produced flows through the analyzer D in counterflow relationship with strong solution flowing downwardly therethrough and in contact with such strong solution. Further refrigerant vapor is generated in the analyzer D by the heat of condensation of absorption solution vapor originally produced in the boiler B.

The refrigerant vapor formed in the analyzer D is conveyed from the upper portion thereof to the upper portion of the condenser C by way of the conduit 11 which includes the air-cooled rectifier R.

The refrigerant vapor in the condenser C is liquefied by heat exchange with air flowing thereover. The liquid refrigerant then flows to the bottom portion of the condenser C from which point it is conveyed to the evaporator supply conduit 14 by means of the conduit 15. The conduit 14 conveys the liquid refrigerant to a pre-cooler conduit or vessel 16 which connects directly to the lower portion of the evaporator.

The conduit 14 is downwardly looped below the pre-cooler 16 to provide a pressure balancing seal. The condenser side of conduit 14 is vented to the rich gas or evaporator discharge side of the gas heat exchanger by means of a conduit 18. Therefore, a liquid column of sufficient height to balance the gas pressure drop across the evaporator will be maintained in the condenser side of conduit 14.

The pre-cooler 16 is provided interiorly thereof with a helical wire or ribbon 17 which is adapted to impede the flow of gases and liquids therethrough and to produce turbulence in such gases and liquids.

The pre-cooler 16 communicates with the bottom portion of the evaporator E adjacent its point of connection with the lean gas supply conduit 19. The evaporator E is shown diagrammatically only. Any desired specific construction may be utilized without departing from the present invention. A preferred evaporator construction is disclosed and claimed in the co-pending application of Curtis C. Coons and William H. Kitto, Serial No. 386,395, filed April 2, 1941, now Patent No. 2,328,196, dated August 31, 1943. An overflow drain 22 is connected between the evaporator E and a rich solution return conduit 38.

The evaporator E is of the type in which the inert gas travels at a velocity sufficient to sweep or drag the liquid refrigerant therethrough as it is evaporating to produce refrigeration and includes an upper enlarged diameter finned box cooling conduit 20 which may be given a slight slope to permit gravity flow of the liquids as the large diameter of the same precludes gas propulsion therein. After the inert gas traverses the entire evaporator, it is conveyed therefrom to the inner or rich gas pass of the gas heat exchanger by means of the conduit 21.

The rich gas which traverses the inner pass of the gas heat exchanger G is conveyed therefrom to the bottom portion of the absorber A by means of a conduit 23 which joins the absorbing apparatus at the junction point of the lower end of the absorber A and an absorber extension 24.

The inert gas travels upwardly through the absorber in counterflow relationship with absorbing solution flowing therethrough by gravity. The absorbing solution absorbs refrigerant vapor from the pressure equalizing medium vapor mixture flowing through the absorber and the heat of absorption is rejected to cooling air flowing over the exterior walls of the absorber conduit and the cooling fins bonded thereto.

After traversing the absorber, the lean gas is conveyed from the upper end thereof to the suction inlet of the circulating fan F by means of a conduit 26. The lean gas is then placed under pressure by the circulating fan F and is conveyed therefrom into the evaporator gas inlet conduit 19 by means of the conduit 27 and the outer pass of the gas heat exchanger G, thus completing the inert gas circuit.

The absorption solution weakened by the generation of refrigerant vapor therefrom in the generator B is conveyed from the generator B to the solution reservoir S by way of the conduit 30, the liquid heat exchanger L, and a looped finned pre-cooling conduit 31. The solution reservoir S is vented by means of a conduit 32 to the suction inlet conduit 26 and circulating fan F. The reservoir being thus subjected to the lowest pressure in the system the liquid will stand therein at a high level. The lean solution is elevated from the solution reservoir S into the suction conduit 26 by means of a gas lift pumping conduit 38 which is supplied with pumping gas by a conduit 35 connected between the discharge conduit 27 of the circulating fan and the conduit 34 below the liquid level normally prevailing therein, whereby the lean solution is elevated by gas lift action.

The lean solution flows downwardly through the absorber in counterflow to the rich gas in the manner heretofore described. The interior of the absorber may be provided with any suitable baffling and flow obstructing means such as the wire coil 37.

After traversing the absorber proper, the enriched solution flows from the lower end thereof into the air-cooled absorber extension 24 which is also provided with an extension of the wire coil 37.

After traversing the extension 24, the strong solution is returned to the analyzer D from the lower end of the extension 24 by way of the conduit 38, the liquid heat exchanger L and the conduit 39, thus completing the absorption solution circuit.

Referring back to the evaporator, it will be appreciated that a certain portion of the inert gas supplied to the conduit 19 will flow through the pre-cooler 16 in counterflow relationship with the condensate flowing therethrough. The conduit 16 is provided interiorly thereof with any suitable flow obstructing and gas turbulence producing means, such as the wire coil 17. The lean gas which traverses the conduit 16 is in contact with the warm liquid refrigerant supplied by the condenser and consequently evaporation of the liquid into the gas takes place at a rapid rate to lower the temperature of the condensate substantially to that prevailing in the bottom portion of the evaporator whereby the evaporator proper is entirely relieved of the load caused by cooling the condensate to the temperature prevailing therein.

After traversing the pre-cooler, the now very rich gas is conveyed from the liquid inlet end thereof to the liquid outlet end of the absorber extension 24 by means of a conduit 42. The lower end of the conduit 42 extends downwardly into a condensate well 43 formed on the lower end of the extension 24 whereby the very rich gas flowing through the conduit 42 must bubble upwardly through a body of condensate in the well 43. The function of the well 43 is simply to throttle the flow of gas through the pre-cooler conduit 42 and absorber extension 24 due to the fact that the conduit 19 is supplied with gas at the pressure prevailing at the discharge end of the circulating fan F diminished by the resistance of the conduits 27, 19 and the lean gas part of the gas heat exchanger, whereas the absorber extension 24 exists at the suction pressure of the fan increased by the gas flow resistance of the absorber A. Therefore, the well 43 is provided in order to bring about a substantial equalization of pressure, in effect, between the pre-cooler 16 and the extension 24 whereby to regulate the rate of flow of lean gas through the pre-cooler 16 and the absorber extension 24.

As a result of the above defined construction, lean gas is brought into contact with warm condensate and flows in counterflow relationship therewith in the pre-cooler 16. Consequently, the condensate which is supplied to the evaporator E exists substantially at the temperature prevailing in the lower portion thereof, and the gas which exits from the pre-cooler 16 contains an extremely high concentration of refrigerant vapor due to high temperature prevailing in the liquid inlet portion thereof.

The concentration of the inert gas which traverses the pre-cooler is much greater than that prevailing in any other portion of the system, and this fact is utilized to improve the overall efficiency of the system in another manner. The absorbing solution which is supplied to the absorber extension 24 has been enriched substantially to the limit possible with conditions prevailing in the absorber and with the concentration prevailing in the inert gas stream supplied to the absorber from the conduit 23. However, it is possible to absorb still more refrigerant vapor into the solution if it is brought into contact with a still richer inert gas refrigerant vapor mixture. This is the function of the absorber extension 24. Despite the high concentration of the strong solution in the absorber 24, the richness of the gas supplied to the conduit 42 is such that further absorption will occur in the absorber extension 24 and at a relatively high temperature. However, this fact is not objectionable at this point of the system, and in fact, is rather an advantage as a relatively great quantity of heat will then be dissipated from a very small heat rejecting area. Consequently, the solution discharged into the conduit 38 from the absorber extension 24 is very highly concentrated, and it is this solution which is supplied directly to the upper portion of the analyzer D.

Due to the extraordinary richness of the solution supplied to the analyzer D, evolution of refrigerant vapor therefrom occurs very readily, and also greatly inhibits the tendency for absorption solution vapor to escape to the analyzer, thereby representing a direct saving of sensible heat supplied from the boiler heater.

It has been found from actual experiment that this type of construction will improve the overall efficiency of the apparatus under severe operating conditions.

Referring to Figure 3 there is illustrated the manner in which the present invention is assembled with a refrigerator cabinet. The insulated cabinet indicated generally at 50 comprises an insulated, interior storage compartment 51, a lower mechanism compartment 52, and a rear cooling or heat rejecting compartment 53 which is defined by a panel 54 spaced rearwardly from the cabinet 50. Various portions of the apparatus have been broken away in order to illustrate the construction more clearly. The location of the boiler, analyzer, absorber and liquid heat exchanger is readily apparent from a perusal of Figure 3, and it is seen that these elements are located generally in the compartment 52. The condenser C and rectifier R are located in the cooling air flue 53 as well as the gas heat exchanger G. The upper central portion of the rear wall 55 of the cabinet 50 is provided with a window opening 56 of a size to permit the evaporator to be passed therethrough. The opening 56 is closed by an insulated closure element 57 shown broken in Figure 3.

In this figure the evaporator E has been shown merely as a box as it will be understood that in an actual construction the evaporator proper will be encased in a suitable housing.

It is also apparent from Figure 3 that the pre-cooler conduit 16 is embedded within the insulation of the window element 57 and extends longitudinally thereof at its lower end, wherefore the pre-cooler conduit 16 is completely embedded within the cabinet, preferably within the rear window thereof and is insulated thereby. Insulation of the pre-cooler 16 inhibits the collection of frost thereon and also prevents absorption of heat thereby. If the pre-cooler were placed within the compartment 51, the same might seriously interfere with the operation of the system and tend to carry the evaporating load; also there might be a tendency for the same to operate at too low a temperature. On the other hand, if the pre-cooler 16 were exposed to the cooling air flowing through the conduit 53, a great deal of the evaporation produced therein would be utilized not to cool the liquid refrigerant, but to cool the air, and would represent in effect a direct loss of refrigerating capacity. Consequently, the pre-cooler has been insulated in the manner herein disclosed in order to assure the efficient operation thereof.

Due to the counterflow construction of the pre-cooler that portion thereof adjacent the conduit 19 operates at a temperature approaching that prevailing in the lower portion of the evaporator E, whereas that portion of the pre-cooler projecting rearwardly into the air flue to receive the connections 14 and 42 operates at a temperature approaching the temperature of the warm liquid refrigerant supplied to the condenser, wherefore the gas stream discharged into the conduit 42 contains an extremely high percentage of refrigerant vapor.

Figures 4, 5:
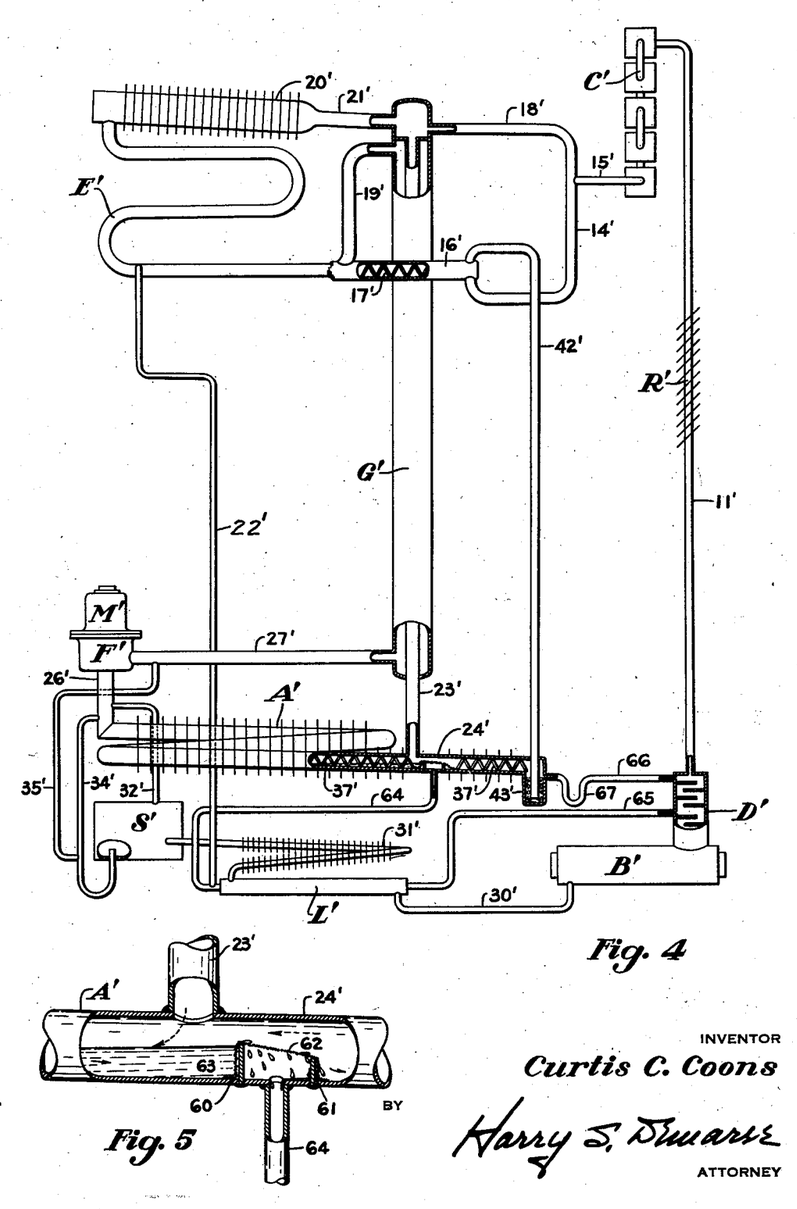
Figure 4 is a diagrammatic representation of a modified form of the invention, certain portions thereof being shown in section.
Figure 5 is an enlarged sectional detailed view of a portion of the apparatus illustrated in Figure 4.

Referring now to Figures 4 and 5, there is disclosed a modified form of the invention, certain portions of which are identical with elements previously described in connection with Figures 1, 2 and 3 and are therefore given the same reference characters primed. It will be understood that this form of the invention is designed and intended to be incorporated in the cabinet in substantially the same manner as described in connection with Figure 3.

Since this form of the invention differs from that described in connection with Figures 1 and 3 only in the manner in which the absorption solution circuit is constructed, only that part of the apparatus will be described specifically, it being understood the remaining portions of the apparatus are merely duplications of Figures 1 and 2.

In this form of the invention the absorption solution strikes a transverse dam 60 located in the absorber extension 24' adjacent its point of connection with the conduit 23' and absorber A'. A lower dam 61 is also provided in the absorber extension 24' spaced a short distance from the dam 60. A suitable capillary conveyer 62, such as wicking or the like, is trained over the dams 60 and 61 with its upstream end resting on the bottom side of the upper end of the absorber extension 24'.

The absorption solution forms a liquid pool indicated generally at 63 behind the dam 60, and this pool overflows into the capillary element 62 and into the space between the dams 60 and 61. A major portion of the absorption solution drops into the space between the dams 60 and 61 and the balance is conveyed by the capillary conveyor over the dam 61 into the absorber extension 24'.

That portion of the absorption solution which discharges into the space between the dams 60 and 61 is conveyed into the mid portion of the analyzer D' by means of the conduit 64, the liquid heat exchanger L" and the conduit 65.

That portion of the absorption solution which is conveyed over the dam 61 flows through the absorber extension 24' flowing over the obstructing wire coil 37' and ultimately into the well 43' into which the rich gas conduit 42' discharges.

After traversing the absorber extension 24', the resulting extremely rich solution is conveyed therefrom to the upper portion of the analyzer D by means of a conduit 66 which includes a looped sealing portion 67.

In the normal operation of this form of the invention the major portion of the absorption solution traverses a normal circuit. However, a portion of the absorption solution, for example 20% thereof, is conveyed through an extra absorber extension in which it is contacted by the extremely rich gas discharged by the pre-cooler. This strong solution is there enriched to an extraordinary degree and is then conveyed to an upper analyzing zone. Due to the smaller volume of absorption solution flowing through the absorber extension in this form of the invention, the concentration of the rich solution discharged therefrom is relatively greater than that of the rich solution discharged from the absorber extension in the form of the invention illustrated in Figure 1. Therefore, in the form of the invention illustrated in Figures 4 and 5 an extremely rich solution is conveyed to the upper portion of the analyzer in which it is brought into contact with the relatively pure vapor which has traversed the lower portion of the analyzer in counterflow relationship with the normally concentrated absorption solution discharged thereinto from the conduit 65. Due to the extremely high concentration of the solution in the upper portion of the analyzer, substantially all absorption solution vapor is condensed therein, and a relatively great quantity of refrigerant vapor is liberated into the hot vapors flowing through the analyzer counter to the rich solution flowing from conduit 66. This form of the invention, therefore, like the form of Figures 1 to 3 provides extra analyzation and absorption to promote the efficiency of the system as well as evaporative pre-cooling.

Figure 6:
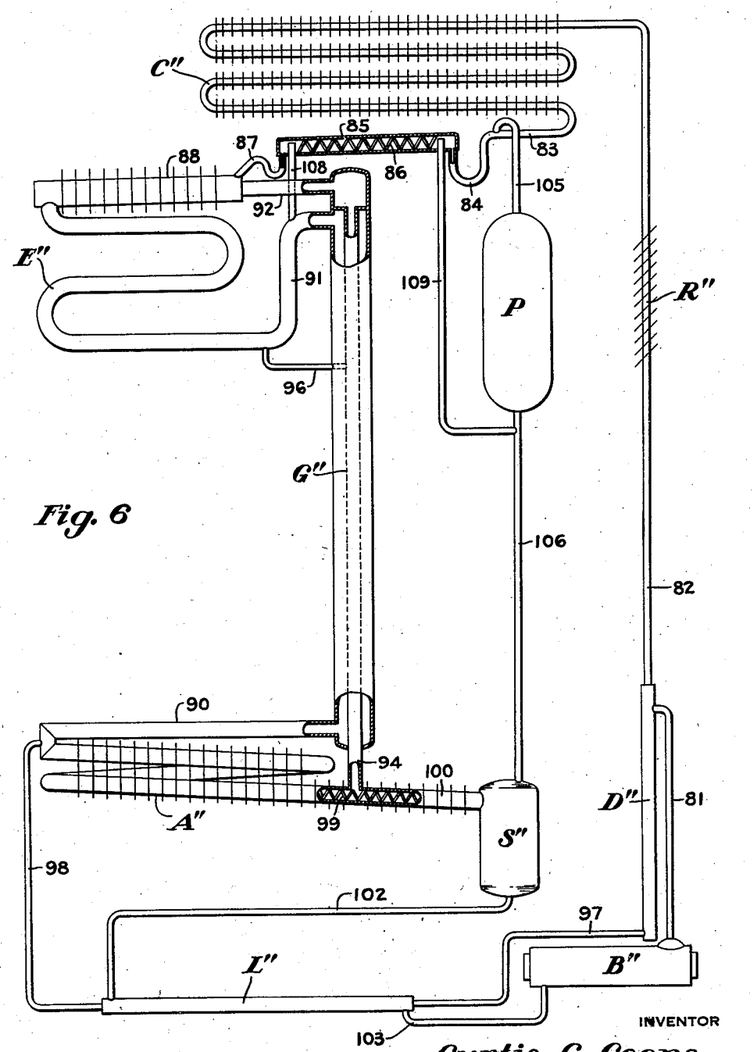
Figure 6 is a diagrammatic representation of another form of the invention, certain portions thereof being illustrated in section.

In the form of the invention illustrated in Figure 6, there is disclosed a three-fluid absorption refrigerating apparatus comprising a boiler B", a separation chamber D", an air-cooled rectifier R", a tubular air-cooled condenser C", an evaporator E", a gas heat exchanger G", a pressure vessel P, a tubular inclined air-cooled absorber A", a solution reservoir S" and a liquid heat exchanger L", all of which are connected by various conduits to form a plurality of gas and liquid circuits constituting a complete refrigerating system.

This refrigerating system will be charged with refrigerant, such as ammonia, suitable absorbent, such as water, and a pressure equalizing medium, preferably a light inert gas, such as hydrogen.

The boiler will be provided with any suitable form of heater such as an electrical cartridge heater or a combustible fuel burner. It is preferable to control the application of heat to the boiler by means of a modulating control mechanism which is responsive to evaporator temperature conditions or to refrigeration demand in the cabinet.

The application of heat to the boiler B" generates refrigerant vapor from the absorption solution therein contained. The vapor so generated passes upwardly through a vapor lift conduit 81 carrying spaced slugs of weak absorption solution upwardly therewith into the separation vessel D". In the vessel D" the liquid and vapor separate and the vapor is conveyed to the upper portion of the condenser C" by means of a conduit 82 which includes the air-cooled rectifier R".

The refrigerant vapor supplied to the condenser C" is liquefied therein by heat exchange with atmospheric air. The liquefied refrigerant formed in the condenser is drained from the bottom portion thereof to a pre-cooling vessel 85 by means of a conduit 83 which includes a U-shaped liquid seal portion 84.

The pre-cooler 85 comprises an elongated slightly inclined cylindrical vessel as illustrated provided interiorly thereof with a suitable baffling and obstructing element such as a wire coil 86.

After traversing the pre-cooler 85, the now cold liquid refrigerant is conveyed therefrom to the upper box-cooling portion 88 of the evaporator E" by means of a conduit 87 which includes a U-shaped liquid sealing trap portion.

The evaporator, absorber and gas heat exchanger have been connected to form an inert gas circuit as follows:

Lean inert gas discharged from the upper end of the absorber A" is conveyed therefrom to the bottom portion of the evaporator E" by way of the conduit 90, the outer path of the gas heat exchanger G", and the conduit 91. After flowing upwardly through the evaporator E" and the box-cooling conduit 88 thereof, the inert gas is conveyed from the conduit 88 to the inner or rich gas heat exchanger G" by means of the conduit 92.

After traversing the inner path of the gas heat exchanger G", the rich inert gas is then conveyed therefrom to the bottom portion of the absorber A" by means of conduit 94. The inert gas flows upwardly through the absorber A" to the conduit 90, thus completing the inert gas circuit.

The above described inert gas circuit is of the type in which the cold, heavy, rich gas flowing downwardly through the gas heat exchanger from the upper end of the evaporator, being heavier than the warmer, lighter lean gas flowing upwardly through the gas heat exchanger from the absorber to the evaporator produces gas circulation by the density differential existing between the two columns of gas.

The liquid refrigerant discharged from the box-cooling conduit 88 in the evaporator E" flows downwardly therethrough by gravity in counterflow relationship with the lean, inert gas flowing upwardly therethrough, and the evaporation of the inert gas produces the refrigerating effect. Any unevaporated material is drained from the bottom portion of the evaporator into the rich gas side of the gas heat exchanger G" by means of a conduit 96.

The lean absorption solution discharged into the vessel D" by the vapor lift pump 81 is conveyed from the bottom portion thereof to the upper ends of the absorber A" by means of the conduit 97, the liquid heat exchanger L" and the rising conduit 98.

The lean solution then flows downwardly through the absorber conduits by gravity in counterflow relationship with rich pressure equalizing medium refrigerant vapor mixture flowing upwardly therethrough. The absorption solution absorbs refrigerant vapor from the gas mixture flowing through the absorber, and the resulting heat of absorption is rejected to cooling air flowing over the exterior walls of the absorber conduit and the cooling fins mounted thereon. If desired, the interior of the absorber conduit may be provided with a suitable liquid pool forming and gas and liquid flow obstructing element, such as the wire coil 99 which serves to promote the heat rejection and gas and liquid contact.

It will be noted that an absorber extension 100 is provided beyond the point of connection between the absorber A" and the rich gas supply conduit 94. The extension 100 is provided with suitable air-cooling fins and an interior obstructing element which, as illustrated, is a continuation of the wire coil 99.

The rich solution formed in the absorber flows through the absorber extension 100 into the solution reservoir S" from which point it is returned to the boiler B" by way of the conduit 102, the liquid heat exchanger L" and the conduit 103.

A pressure vessel P is connected on one side to the condenser side of the condenser sealing loop 84 by means of the conduit 105 and to the solution reservoir S" by means of the conduit 106. The function of the pressure vessel is to increase the pressure of the system, the quantity of inert gas circulating in the active portion of the system, and to decrease the quantity of refrigerant circulating in the active portion of the system when high air temperatures prevail in order to maintain the capacity of the system.

Lean inert gas is supplied to the discharge end of the pre-cooling vessel 85 by means of a conduit 108 which is connected to the evaporator gas inlet conduit 91. After traversing the pre-cooling vessel 85, the resulting very rich and heavy inert gas and refrigerant vapor mixture is conveyed from the liquid inlet end of the vessel 85 to the conduit 106 by means of a conduit 109 wherefore the pressure vessel connection 106 also serves as a circulatory connection for the pre-cooler.

The very rich inert gas discharged into the solution reservoir S" by means of conduit 106 flows upwardly through the absorber extension 100 in counterflow relationship with the rich solution flowing therethrough. Due to the very high refrigerant vapor content of this mixture, further absorption occurs in the extension 100 and at a temperature higher than that generally prevailing in the absorber A" whereby to further increase the refrigerant concentration of the strong solution which is returned to the boiler which results in improving the efficiency and in decreasing the rectification losses of the system.

Consequently, in this form of the invention like those previously described, a certain percentage of the lean inert gas is diverted through an evaporative pre-cooling element to cool the liquid refrigerant supplied to the evaporator substantially to the temperature of the inlet portion thereof and the resulting very rich gas is utilized to increase the absorption solution concentration on the rich side thereof with resulting improvements in the efficiency of the apparatus.

This form of the invention may be incorporated in a cabinet similar to that described in connection with Figure 3. However, in this case the pre-cooler will be located above the evaporator and will therefore be embedded in the upper portion of the cabinet or of the evaporator opening sealing plate.

It will be understood that in each form of the invention the pre-cooler could be operated with rich gas instead of lean gas, if desired, in which event the pre-cooler would receive rich gas from the evaporator gas outlet connection. In such an arrangement there would be very little pressure differential between the pre-cooler discharge and the absorber extension wherefore the well structure illustrated generally at 43 could be either decreased in size or eliminated entirely. However, the lean gas type of pre-cooler is the preferred form.

It will be understood in every case that the various absorber extensions may actually lie in the same plane with the absorber. They have been shown projecting laterally in the diagrammatic illustrations in the accompanying drawings for purposes of clarity.

The present invention provides a highly efficient arrangement due to the fact that the improved efficiencies provided by the pre-cooler, the absorber extension and the increase between the weak and strong solution concentrations all act conjointly to increase the efficiency and capacity of the unit.

While the invention has been illustrated and described herein in detail, it is not to be construed as being limited thereto as various changes may be made in the proportion, arrangement, and construction of parts without departing from the spirit of the invention or the scope of the appended claims.

I claim:

1. Absorption refrigerating apparatus comprising an inert gas circuit including an evaporator and an absorber, a solution circuit including a generator and said absorber, a condenser connected to receive refrigerant vapor produced in said generator, a pre-cooler connected between said condenser and said evaporator, means for conveying inert gas from said inert gas circuit and for flowing it through said pre-cooler, a second absorber connected to said solution circuit to receive strong solution, and means for flowing inert gas discharged from said pre-cooler through said second absorber.

2. Absorption refrigerating apparatus comprising an inert gas circuit including a pair of evaporators and a pair of absorbers, a solution circuit including said absorbers and a generator, means for liquefying refrigerant vapor produced in said generator and for flowing the liquid refrigerant through said evaporators in series, said inert gas and solution circuit being so connected that solution flows through said absorbers serially in part and in parallel in part and inert gas flows through said evaporators in parallel and serially through said absorbers.

3. Absorption refrigerating apparatus comprising a generator, a condenser connected to receive refrigerant vapor from said generator, a pair of evaporators serially connected to said condenser for receiving refrigerant liquid therefrom, a first absorber serially connected to said generator for flow of absorption solution therethrough, a second absorber connected to said generator and to said first absorber for flow of a portion of said absorption solution therethrough, and means providing an inert gas circuit for said absorbers and said evaporators arranged to connect said evaporators in parallel and to connect said absorbers in series with respect to gas flow.

4. Absorption refrigerating apparatus comprising a generator, a condenser connected to receive refrigerant vapor from said generator, a pair of evaporators connected to said condenser for receiving refrigerant liquid therefrom serially, a pair of absorbers connected to said generator for flow of absorption solution therethrough, and means providing a first inert gas circuit in which the evaporator last to receive refrigerant liquid and one of said absorbers are serially connected and a second inert gas circuit in which the other of said evaporators and said absorbers are connected serially with respect to each other and in parallel with a portion of said first inert gas circuit.

5. Absorption refrigerating apparatus comprising a generator an analyzer connected to said generator, a condenser connected to receive refrigerant vapor from said analyzer, a pair of evaporators connected to receive refrigerant liquid from said condenser, a pair of absorbers connected to receive weak absorbing solution from said generator, means for conveying strong absorbing solution from each of said absorbers to different portions of said analyzer, and means providing a first inert gas circuit in which one of said evaporators and one of said absorbers are serially connected and a second inert gas circuit in which the other of said evaporators and absorbers are connected serially with respect to each other and in parallel with a portion of said first inert gas circuit.

6. Absorption refrigerating apparatus comprising an inert gas circuit including an evaporator and an absorber, a solution circuit including a generator and an absorber, a condenser connected to receive refrigerant vapor from said generator, a pre-cooler connected to convey refrigerant liquid from said condenser to said evaporator, an absorber extension connected in the strong solution side of said absorption solution circuit, and means for diverting inert gas from said inert gas circuit through said pre-cooler and said absorber extension, said absorber extension being arranged to return such diverted inert gas to said inert gas circuit.

7. Absorption refrigerating apparatus comprising an inert gas circuit including an evaporator and an absorber, a solution circuit including a generator and an absorber, a condenser connected to receive refrigerant vapor from said generator, a pre-cooler connected to receive refrigerant liquid from said condenser, power driven means in said inert gas circuit arranged to propel inert gas through said evaporator with a velocity sufficient to convey the evaporating refrigerant liquid therethrough, said pre-cooler being connected to the gas inlet portion of said evaporator to discharge cooled liquid refrigerant thereinto and to receive inert gas therefrom, and means for conveying inert gas from the liquid inlet portion of said pre-cooler to the solution outlet portion of an absorber extension connected to receive strong solution from said absorber and to discharge thereinto the inert gas supplied from said pre-cooler.

8. Absorption refrigerating apparatus comprising an inert gas circuit including an evaporator and an absorber, a solution circuit including a generator and an absorber, a condenser connected to receive refrigerant vapor from said generator, a pre-cooler connected to receive refrigerant liquid from said condenser, power driven means in said inert gas circuit arranged to propel inert gas through said evaporator with a velocity sufficient to convey the evaporating refrigerant liquid therethrough, said pre-cooler being connected to the gas inlet portion of said evaporator to discharge cooled liquid refrigerant thereinto and to receive inert gas therefrom, means for conveying inert gas from the liquid inlet portion of said pre-cooler to the solution outlet portion of an absorber extension connected to receive strong solution from said absorber and to discharge thereinto the inert gas supplied from said pre-cooler, and means for limiting the flow of inert gas through said pre-cooler and absorber extension.

9. Absorption refrigerating apparatus comprising an inert gas circuit including an absorber and an evaporator, a solution circuit including said absorber and a generator, a condenser connected to receive refrigerant vapor from said generator, a refrigerant pre-cooler connected to convey refrigerant liquid from said condenser to said evaporator and to receive inert gas from said inert gas circuit, a power driven circulator in said inert gas circuit for propelling the inert gas through said evaporator with sufficient velocity to sweep or drag the evaporating refrigerant therethrough, means for conveying inert gas from said pre-cooler to said absorber, and means for throttling the flow of inert gas through said pre-cooler.

10. Absorption refrigerating apparatus comprising an inert gas circuit including an absorber and an evaporator, a solution circuit including a boiler-analyzer assembly and said absorber, means for liquefying refrigerant vapor produced in said boiler-analyzer assembly, a pre-cooler connected to receive refrigerant liquid from said liquefying means and to discharge the cooled liquid into said evaporator, said pre-cooler also being arranged to receive inert gas from said inert gas circuit, an absorber extension connected to receive inert gas from said pre-cooler and to return the same to said inert gas circuit, means in said solution circuit for returning a portion of the strong solution formed in said absorber to said analyzer, means for directing the balance of such strong solution into said absorber extension, and means for conveying the solution which has passed through said absorber extension into contact with vapor which has previously passed in contact with the strong solution supplied to said analyzer from said absorber.

11. That improvement in the art of absorption refrigeration which includes the steps of expelling refrigerant vapor from solution in an absorbent, liquefying the refrigerant vapor, cooling the refrigerant liquid by partial evaporation into a body of inert gas, producing a refrigerating effect by evaporating the cooled liquid into another body of inert gas, absorbing the refrigerant vapor from said other body of inert gas by contacting the same with solution previously weakened by expulsion of refrigerant vapor therefrom, increasing the refrigerant concentration of solution previously enriched by contact with said other body of inert gas by contacting the same with said first mentioned body of inert gas and passing the solution thus increased in refrigerant content into intimate contact with freshly expelled vapor.

12. That improvement in the art of absorption refrigeration which includes the steps of expelling refrigerant vapor from solution in an absorbent, liquefying the refrigerant vapor, cooling the refrigerant liquid by partial evaporation into a body of inert gas, producing a refrigerating effect by evaporating the cooled liquid into another body of inert gas, absorbing the refrigerant vapor from said other body of inert gas by contacting the same with solution previously weakened by expulsion of refrigerant vapor therefrom, conveying a portion of the solution thus increased in refrigerant content into contact with freshly expelled vapor, enriching the balance of the solution thus increased in refrigerant content by passing the same into intimate contact with said first mentioned body of inert gas, and passing the thus enriched solution into contact with vapor previously contacted by said portion of the solution.

13. That improvement in the art of refrigeration which includes the steps of expelling refrigerant vapor from solution in an absorbent, liquefying the refrigerant vapor so expelled, evaporating a part of the refrigerant liquid at a first temperature level in the presence of a first body of inert gas, evaporating the residue liquid refrigerant at a second temperature level in the presence of a second body of inert gas, absorbing refrigerant vapor from said second body of inert gas by conducting the same into contact with absorbent from which refrigerant vapor has previously been expelled and then absorbing refrigerant vapor from said first body of inert gas by conducting the same into contact with at least a portion of the absorption solution which has been contacted by said second body of inert gas.

14. Absorption refrigerating apparatus comprising a generator, a condenser connected to receive refrigerant vapor from said generator, a pair of evaporators serially connected to said condenser for receiving refrigerant liquid therefrom, a pair of absorbers connected to said generator for circulation of absorption solution therebetween, said absorbers and said generator being so connected that only a portion of the absorption solution circulates through one of said absorbers, and means providing an inert gas circuit for said absorbers and said evaporators arranged to connect said evaporators in parallel and to connect said absorbers in series with respect to gas flow.

15. Absorption refrigerating apparatus of the three-fluid type comprising an absorber and an evaporator connected to form an inert gas circuit arranged for gravity actuated gas circulation, means for producing refrigerant liquid, a second evaporator connected to receive liquid refrigerant from said liquid refrigerant producing means and to discharge residue refrigerant into said first mentioned evaporator, a second absorber, and means connecting said second absorber, said second mentioned evaporator and said first mentioned absorber to form a second gravity actuated inert gas circuit.

16. Absorption refrigerating apparatus of the three-fluid type comprising an absorber and an evaporator connected to form an inert gas circuit arranged for gravity actuated gas circulation, means for producing refrigerant liquid, a second evaporator connected to receive liquid refrigerant from said liquid refrigerant producing means and to discharge residue refrigerant into said first mentioned evaporator, a second absorber, means connecting said second absorber, said second mentioned evaporator and said first mentioned absorber to form a second gravity actuated inert gas circuit, and a pressure vessel connected to said second inert gas circuit and to the liquid receiving portion of said second evaporator.

17. That improvement in the art of refrigeration which includes the steps of expelling refrigerant vapor from solution in an absorbent, liquefying the refrigerant vapor so expelled, evaporating a part of the refrigerant liquid at a high temperature level in the presence of a first body of inert gas to produce an inert gas refrigerant vapor mixture of high refrigerant vapor content, evaporating the residue refrigerant liquid in the presence of a second body of inert gas to produce an inert gas refrigerant vapor mixture of a lower refrigerant vapor content, conducting absorption solution from which refrigerant vapor has previously been expelled into contact with said mixture of inert gas and refrigerant vapor of lower refrigerant vapor content to produce absorption solution having a first refrigerant content, and conducting said body of inert gas and refrigerant vapor having a high refrigerant vapor content into contact with at least a portion of the absorption solution having a first refrigerant content to produce a body of absorption solution having a refrigerant content which is higher than the refrigerant content of said body of absorption solution having a first refrigerant content.

18. Absorption refrigerating apparatus comprising an inert gas circuit including an evaporator and an absorber, a solution circuit including a generator and said absorber, a condenser connected to receive refrigerant vapor produced in said generator, a pre-cooler connected between said condenser and said evaporator, and arranged to be traversed by inert gas diverted from said inert gas circuit, a second absorber forming part of said solution circuit and arranged to receive strong solution from the first mentioned absorber, and means for introducing inert gas discharged from said pre-cooler into said second absorber.

19. Absorption refrigerating apparatus of the three-fluid type comprising an absorber and an evaporator connected to form an inert gas circuit, means for producing refrigerant liquid, a second evaporator connected to receive refrigerant liquid from said refrigerant liquid producing means and to discharge residue refrigerant liquid into said first mentioned evaporator, a second absorber, means connecting said second evaporator and said absorbers to form a second inert gas circuit, and power operated means for circulating inert gas through both of said inert gas circuits.

CURTIS C. COONS.